United States Patent [19]

Hirano et al.

[11] Patent Number: 5,293,270
[45] Date of Patent: Mar. 8, 1994

[54] READING LENS SYSTEM

[75] Inventors: Hiroyuki Hirano; Takashi Iizuka, both of Tokyo, Japan

[73] Assignee: Asahi Kogaku Kogyo Kabushiki Kaisha, Tokyo, Japan

[21] Appl. No.: 6,788

[22] Filed: Jan. 21, 1993

[30] Foreign Application Priority Data

Jan. 31, 1992 [JP] Japan .................... 4-16901

[51] Int. Cl.$^5$ .................................. G02B 9/62
[52] U.S. Cl. ........................ 359/760; 359/756
[58] Field of Search ............ 359/754, 756, 757, 760

[56] References Cited

U.S. PATENT DOCUMENTS

| | | | |
|---|---|---|---|
| 3,815,974 | 6/1974 | Momiyama | 359/757 |
| 4,812,027 | 3/1989 | Yanagisawa | 359/756 |
| 5,159,496 | 10/1992 | Kataoka | 359/754 |

FOREIGN PATENT DOCUMENTS

| | | |
|---|---|---|
| 50-62631 | 5/1975 | Japan . |
| 55-100517 | 7/1980 | Japan . |
| 58-86510 | 5/1983 | Japan . |
| 59-90810 | 5/1984 | Japan . |

*Primary Examiner*—Bruce Y. Arnold
*Assistant Examiner*—Evelyn A. Lester
*Attorney, Agent, or Firm*—Sughrue, Mion, Zinn, Macpeak & Seas

[57] ABSTRACT

An improved Gauss-type reading lens system having high lens performance in which there is only a small difference in performance in the meridional and sagittal directions and which can efficiently correct aberrations at various operating wavelengths to produce only limited chromatic aberrations. The system includes, in order from the object side, a positive meniscus first lens element having a convex surface directed toward the object, a positive meniscus second lens element having a convex surface directed toward the object, a negative meniscus third lens element having a convex surface directed toward the object, a negative meniscus fourth lens element having a concave surface directed toward the object, a positive meniscus fifth lens element having a concave surface directed toward the object and a biconvex sixth lens element. The second and third lens elements are cemented and the fourth and fifth lens elements are cemented. The reading lens system satisfies certain conditions.

1 Claim, 1 Drawing Sheet

READING LENS SYSTEM

BACKGROUND OF THE INVENTION

This application is based on and claims priority from Japanese Application No. HEI 4-16901 filed Jan. 31, 1992, the disclosure of which is incorporated herein by reference.

This invention relates to a reading lens system for use with a facsimile apparatus, an image scanner or other optical equipment.

Reading lens systems of the type contemplated by the present invention must ensure a resolution comparable to that achieved by a CCD sensor or other image-receiving device to be used. To this end, a resolution of about 7 μm is necessary for the image part. To attain a satisfactory contrast at such a high spatial frequency and to minimize the potential drop in the brightness at the edge of the image field, the aperture efficiency must be 100% while the distortion is effectively corrected.

To meet these conditions, certain Gauss-type lenses have heretofore been used. See, for example, Japanese Patent Laid-Open Publications No. SHO 50-62631, No. SHO 59-90810, etc.

However, such conventional Gauss-type lenses have had the problem that when they have an F number of 1:4 and are used at a half-view angle of about 20 degrees, they have a substantially different performance in the sagittal and meridional directions. Particularly, the lens performance in the sagittal direction has not been sufficiently considered.

This problem may be explained as follows. The CCD sensor conventionally used as an image-receiving device in facsimile and other optical equipment is a line sensor having pixels arranged on a single line. Hence, as long as the performance of a reading lens is satisfactory in the meridional direction parallel to the alignment of pixels, no deleterious effect occurs in the reading operation even if the lens performance is somewhat poor in the sagittal direction.

The recent advances in color reproduction technology have been remarkable in facsimile and image scanners, and an apparatus has been introduced that uses a CCD sensor having pixels arranged in three lines and which can read an image in one scan cycle after the image has been color-separated with a wavelength-dependent filter provided in each pixel line.

The conventional Gauss-type lenses have the problem that if they are used with such a color reproduction apparatus, the lenses cannot achieve a faithful color reproduction because of poor lens performance in the sagittal direction. Furthermore, most of the conventional reading lenses are designed for monochromatic reproduction and occasionally experience substantial variations in aberrations at a specific wavelength, which makes these lenses unsuitable for color reproduction.

SUMMARY OF THE INVENTION

The present invention has been designed in view of the above-described circumstances and has an object of providing a high-performance reading lens system which has only a small performance difference in the meridional and sagittal directions and which can efficiently correct aberrations at various operating wavelengths to produce only limited chromatic aberrations.

This object of the present invention can be attained by a Gauss-type reading lens system having a four-unit six-element composition that comprises, in order from the object side, a positive meniscus first lens element having a convex surface directed toward the object, a positive meniscus second lens element having a convex surface directed toward the object, a negative meniscus third lens element having a convex surface directed toward the object, a negative meniscus fourth lens element that has a concave surface directed toward the object, a positive meniscus fifth lens element that has a concave surface directed toward the object and a biconvex sixth lens element, the second and third lens elements being cemented and the fourth and fifth lens elements being cemented, characterized in that the reading lens system satisfies the following condition:

| | f = 35.00 FNO 1:4.0 m = −0.126 ω = 19.2° | | | |
|---|---|---|---|---|
| i | r(i) | d(i) | n(i) | ν(i) |
| 1 | 21.600 | 3.58 | 1.71615 | 53.6 |
| 2 | 58.500 | 0.10 | | |
| 3 | 10.688 | 3.25 | 1.77620 | 49.6 |
| 4 | 18.810 | 0.90 | 1.72311 | 29.5 |
| 5 | 7.547 | 11.38 | | |
| 6 | −9.200 | 0.90 | 1.72311 | 29.5 |
| 7 | −21.730 | 2.86 | 1.77620 | 49.6 |
| 8 | −11.551 | 0.10 | | |
| 9 | 222.238 | 3.43 | 1.71615 | 53.8 |
| 10 | −30.398 | | | | where f denotes the focal length of the overall system, FNO is the F number, m is the magnification, ω is the half-view angle, r(i) is the radius of curvature of the (i)th surface, d(i) is the distance between the (i)th surface and the (i+1)th surface, n(i) is the refractive index of the lens defined by the (i)th and the (i+1) surfaces at the e-line, and ν(i) is the Abbe number of the lens defined by the (i)th and (i+1)th surfaces.

DETAILED DESCRIPTION OF THE PREFERRED EMBODIMENT

A reading lens system according to an embodiment of the present invention is described below.

Figure 1:
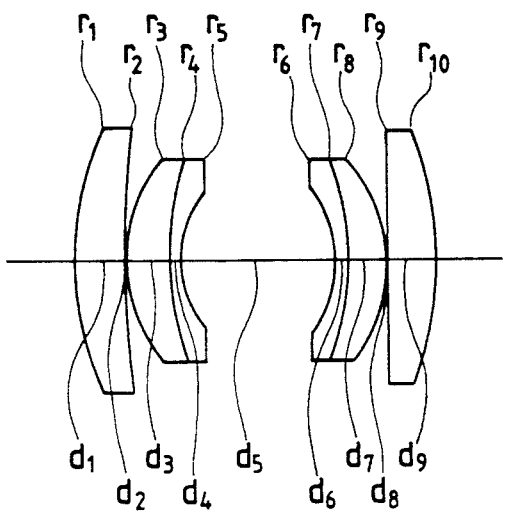
FIG. 1 is a simplified cross-sectional view of the reading lens system according to an example of the present invention.

FIG. 1 is a 'simplified cross-sectional view of the reading lens system. Specific data for this lens system are as shown in Table 1, in which FNO denotes the N number, f is the focal length at the e-line, m is the magnification, ω is the half-view angle, fB is the backfocus, r(i) the radius of curvature of the (i)th surface, d(i) is the distance between the (i)th surface and the (i+1)th surface, n(i) is the refractive index of the lens defined by the (i)th and (i+1)th surfaces at the e-line, and ν(i) is the Abbe number of the lens defined by the (i)th and (i+1)th surfaces.

Figure 2:
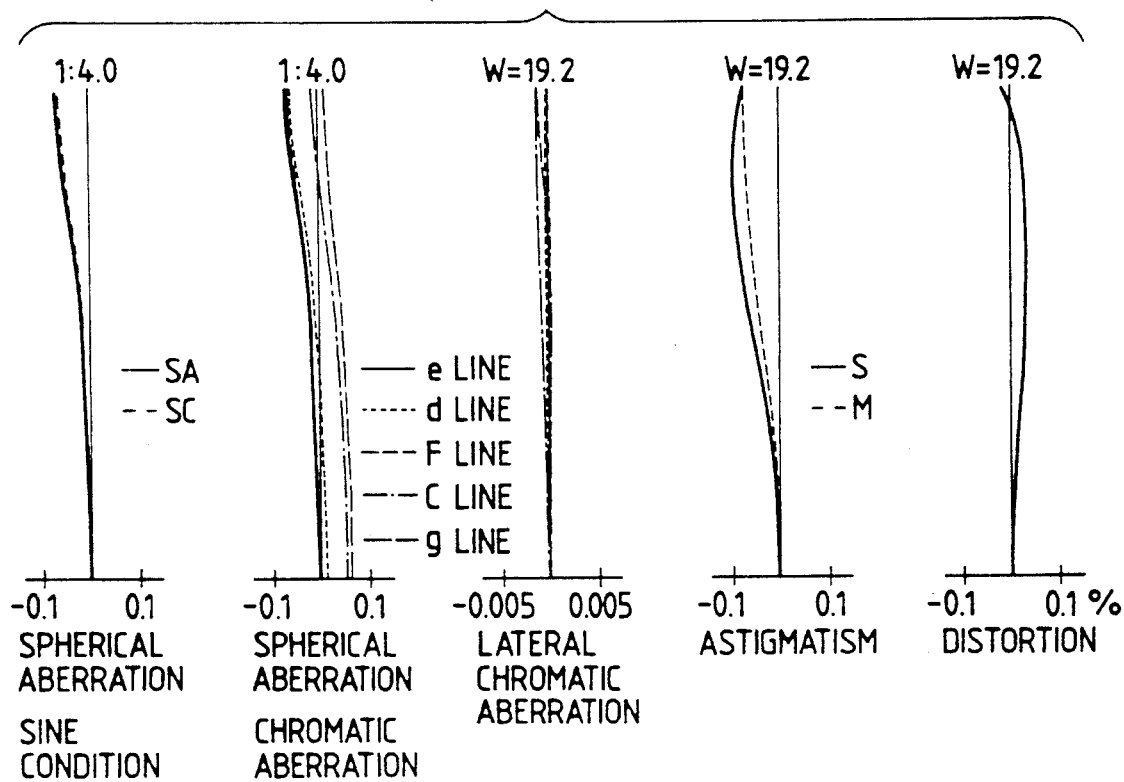
FIG. 2 is a set of graphs plotting the aberration curves obtained with the lens system shown in FIG. 1.

FIG. 2 shows a set of graphs plotting the curves of spherical aberration SA, sine conditions SC chromatic aberrations expressed by spherical aberration at the e-, d-, F-, C- and g-lines, lateral chromatic aberration, astigmatism (S, sagittal; M, meridional) and distortion, that are obtained with the lens system of the example. The lens system characterized by the aberration data shown in FIG. 2 has the basic composition tabulated in Table 1 but it also includes a plane-parallel glass plate (T=1.1 mm; n=1.51825; ν=64.1) on the CCD.

TABLE 1

| | f = 35.00 FNO 1:4.0 m = −0.126 ω = 19.2° fB = 22.99 | | | |
|---|---|---|---|---|
| i | r(i) | d(i) | n(i) | ν(i) |
| 1 | 21.600 | 3.58 | 1.71615 | 53.6 |
| 2 | 58.500 | 0.10 | | |
| 3 | 10.688 | 3.25 | 1.77620 | 49.6 |
| 4 | 18.810 | 0.90 | 1.72311 | 29.5 |
| 5 | 7.547 | 11.38 | | |
| 6 | −9.200 | 0.90 | 1.72311 | 29.5 |
| 7 | −21.730 | 2.86 | 1.77620 | 49.6 |
| 8 | −11.551 | 0.10 | | |
| 9 | 222.238 | 3.43 | 1.71615 | 53.8 |
| 10 | −30.398 | | | |

As described above, the reading lens system of the present invention has a four-unit-six-element composition with an F number of 1:4 and a half-view angle of at least 19.2 degrees. By satisfying the conditions set forth above, the lens system can be adapted to have only a small performance difference in the meridional and sagittal directions while efficiently correcting aberrations at various operating wavelengths to produce only limited chromatic aberrations.

Although the present invention has been fully described by way of the example thereof with reference to the accompanying drawings, various changes and modifications will be apparent to those having skill in this field without departing from the scope of the invention as defined in the appended claims.

What is claimed is:

1. A Gauss-type reading lens system, comprising in order from the object side:

a positive meniscus first lens element having a convex surface directed toward an object;

a positive meniscus second lens element having a convex surface directed toward the object;

a negative meniscus third lens element cemented with said second lens element and having a convex surface directed toward the object;

a negative meniscus fourth lens element having a concave surface directed toward the object;

a positive meniscus fifth lens element cemented with said fourth lens element and having a concave surface directed toward the object; and a biconvex sixth lens element; and wherein said reading lens system satisfies the following conditions:

| | f = 35.00 FNO 1:4.0 m = −0.126 ω = 19.2° | | | |
|---|---|---|---|---|
| i | r(i) | d(i) | n(i) | ν(i) |
| 1 | 21.600 | 3.58 | 1.71615 | 53.6 |
| 2 | 58.500 | 0.10 | | |
| 3 | 10.688 | 3.25 | 1.77620 | 49.6 |
| 4 | 18.810 | 0.90 | 1.72311 | 29.5 |
| 5 | 7.547 | 11.38 | | |
| 6 | −9.200 | 0.90 | 1.72311 | 29.5 |
| 7 | −21.730 | 2.86 | 1.77620 | 49.6 |
| 8 | −11.551 | 0.10 | | |
| 9 | 222.238 | 3.43 | 1.71615 | 53.8 |
| 10 | −30.398 | | | | where f denotes the focal length of the overall system, FNO is the F number, m is the magnification, ω is the half view angle, r(i) is the radius of curvature of the (i)th surface, d(i) is the distance between the (i)th surface and the (i+1)th surface, n(i) is the refractive index of the lens defined by the (i)th and (i+1)th surfaces at the e-line, and ν(i) is the Abbe number of the lens defined by the (i)th and (i+1)th surfaces.

* * * * *